UNITED STATES PATENT OFFICE.

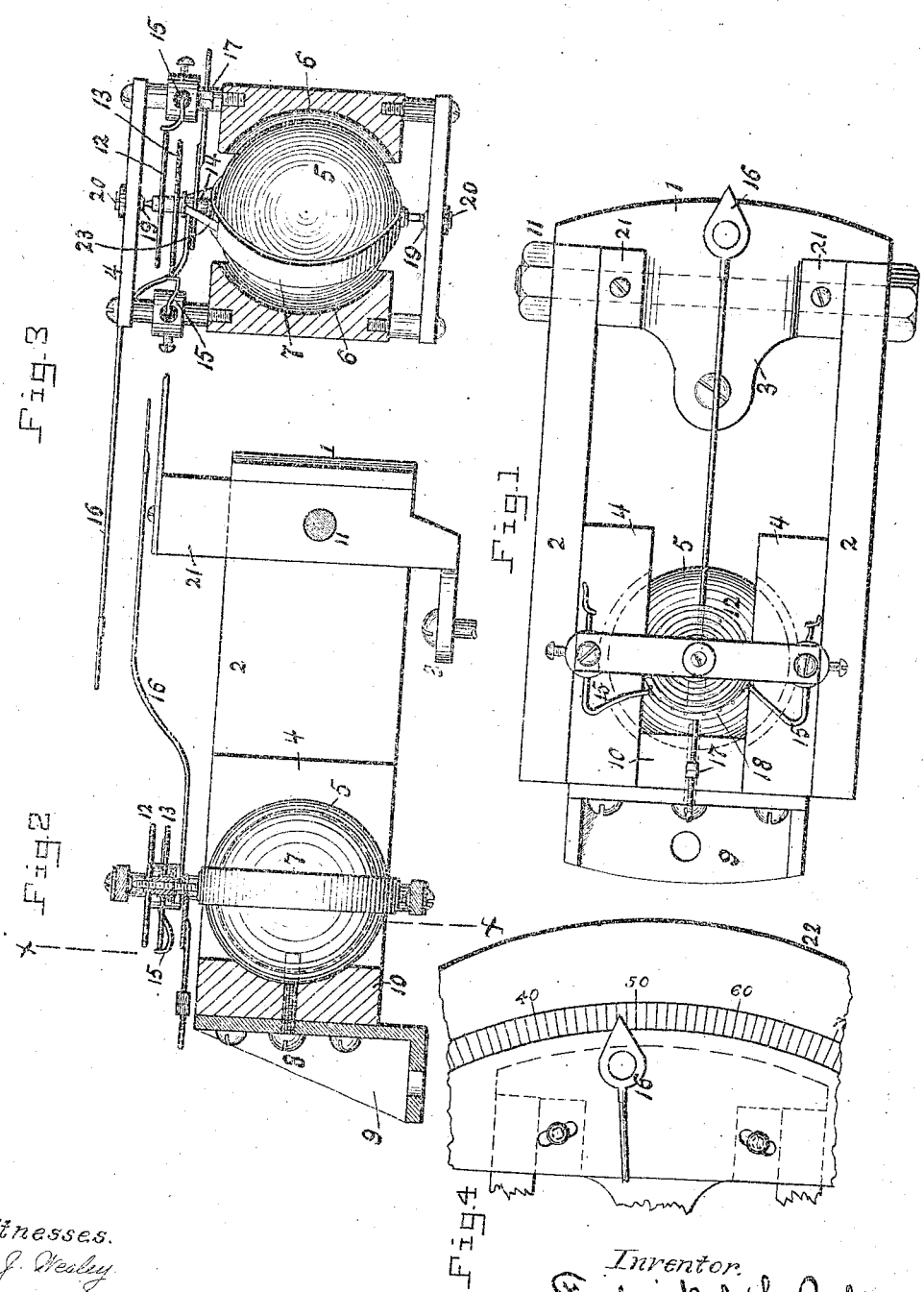

FREDRICK A. LA ROCHE, OF NEW YORK, N. Y.

ELECTRICAL MEASURING INSTRUMENT.

SPECIFICATION forming part of Letters Patent No. 661,127, dated November 6, 1900.

Application filed August 22, 1900. Serial No. 27,672. (No model.)

*To all whom it may concern:*

Be it known that I, FREDRICK A. LA ROCHE, a citizen of the United States of America, residing at the city of New York, in the county of New York and State of New York, have invented certain new and useful Improvements in Electrical Measuring Instruments, of which the following is a specification.

My invention in electrical measuring instruments relates to that class of instruments adapted to measure the strength of electrical currents or the difference of potential between two terminals of a circuit through which a current is adapted to flow. These instruments are called, respectively, "ammeters" and "voltmeters."

My invention in electrical measuring instruments also relates to wattmeters, or instruments for measuring both the strength of the current and the difference of potential between the terminals of any circuit conveying said current; and the objects of my invention are to provide a more practical form of construction in the magnetic field of the instrument to facilitate the adjustment of the calibrated scale; to provide for eliminating some of the errors which occur in instruments of this class in vogue at the present time, due to the mutual and self induction effects on some of the working parts of the instrument; to secure a more constant magnetic field of force between the poles of the magnet, and to construct the pole-pieces of the said magnet in a manner so as to enable the motor-coil of the instrument to cut the greatest number of lines of force possible, thereby reducing the size and weight of the instrument.

The chief features of my invention are clearly shown in the drawings which accompany this specification and fully described in the subject-matter thereof, and more particularly pointed out in the claims.

In reference to the drawings, Figure 1 is a top plan view of my improved electrical measuring instrument eliminating the graduated scale. Fig. 2 is a sectional elevation showing the motor-coil and one of the arms of the permanent magnets removed. Fig. 3 is a vertical cross-section taken through the line X X of Fig. 2 in a manner so as to best show the operating parts. Fig. 4 is a detail view of the graduated scale and pole-pieces, showing the manner in which I adjust the scale after the instrument is constructed.

Similar numerals of reference relate to similar parts throughout the several views.

In referring to the figures the permanent magnet 1, having the limbs 2, the yoke-pieces 3, pole-pieces 4, and armature-core 5 constitute the members which form the magnetic circuit of the instrument. In practice I have found that it is rather difficult with highly-carbonized steel, in which magnetic permanency is required, to bend the two limbs 2 2 of the magnet in one piece, so as to bring the poles into the proper position, as shown in the drawings. I therefore prefer to construct magnet 1 in the manner illustrated most clearly in Fig. 1 by bolting the limbs 2 2 onto the yoke-piece 3. Of course the magnetic reluctance of the steel at the joint is somewhat greater than in a continuous and homogeneous mass of magnetic material; but the reluctance at the joint depends very largely on accuracy of workmanship, and the means for making the joint is purely mechanical. The construction shown has been found by me to give the greatest amount of permanence to the magnetism of the limbs 2 2. It is also found in practice to be more easily adjusted with respect to the air-gap 6 and armature-core 5.

In order to reduce the magnetic reluctance of the air-gap 6 and at the same time have the greatest number of lines of force in a given cross-section pass through the path cut by the armature-coil 7, I construct the pole-pieces 4 4 of my improved electrical measuring instrument so as to have a spherical concavity in their inner surfaces, so as to partly envelop the armature-core 5. The armature-core 5 is rigidly secured in its position by a bolt 8, which passes through a standard 9, which is secured to the face of the instrument.

In order to secure the two pole-pieces 4 4 rigidly and maintain the proper distance between their inner concave surfaces, I employ a block 10, of some suitable non-magnetic material, interposed between the free ends of the pole-pieces 4 4 and rigidly secured to the standard 9 by machine-screws or bolts, so that the whole shall be firmly held in position with respect to the pole-pieces and by a double-headed bolt 11 at the yoke.

Encircling the armature-core and adapted to swing freely upon an axis is the armature-coil 7. This I prefer to construct of some light metallic framework, preferably aluminium, in the form of a hoop, upon which I wind as many turns of fine insulated copper wire as is consistent with the required calibration of the instrument and the intensity of the magnetic field of force in order to produce the desired reading, the two ends of the coil being brought out to the two insulated hair-springs 12 and 13, wound in opposite directions about the axle 14. The free ends of these hair-springs are connected to insulated wires 15, the arrangement being such that when an electrical circuit is closed, so as to cause a momentary current to pass around the two hair-springs, the mutual attraction between the successive coils of the hair-springs in one will be neutralized by the current passing in the opposite direction in the other hair-spring, thereby eliminating any additional strain or lack of strain brought upon the spring by its effort to return the armature-coil 7 into its normal position when the coil shall have been deflected by a current traversing the same. The two hair-springs 12 and 13, together with the axle 14, are carried by a light bridge 23, which is secured to the armature-core by binding it with a light silk thread or the like. The aluminium vane or pointer 16 is also carried by the bridge 23 and axle 14 and has a counterbalancing-weight 17 and segmental arm 18, having perforations for minute adjustment. The jewels 19 receive the hardened-steel pivots 20, upon which the entire movable element of the instrument freely swings.

In order to facilitate the calibration of my improved instrument, I employ the standards 21, which I construct by forming the yoke 3 so as to be raised at these two points to secure the graduated scale or dial 22 by means of two adjusting-screws and slots, as shown in the drawings. By this feature of my invention considerable time and labor are saved in the calibration of the instrument and greater accessibility for repairs is thereby rendered.

I am aware that many minor changes may be made in the construction of my improved electrical measuring instrument, and I do not desire to limit my invention in scope to the exact details of construction shown in the different figures; but What I do claim, and desire to secure by Letters Patent of the United States, is—

1. In an electrical measuring instrument, a magnetic field composed of a sectional permanent magnet having a yoke and permanent magnets secured to the yoke, pole-pieces for the permanent magnet having opposing concave surfaces, and a spherical armature-core therefor, a circular armature adapted to rotate over the surface of said core between said pole-pieces and said armature-core, terminal conductors for the said armature being differentially coiled about the shaft of said armature so as to neutralize the effects of the mutual and self induction of the currents carried by said terminal conductors; substantially as described.

2. In an electrical measuring instrument, a magnetic field composed of a sectional permanent magnet having a yoke and permanent magnets secured to the yoke, pole-pieces for the permanent magnet having opposing concave surfaces, and a spherical armature-core therefor, a circular armature adapted to rotate over the surface of said core between said pole-pieces and said armature-core, terminal conductors for the said armature being differentially coiled about the shaft of said armature so as to neutralize the effects of the mutual and self induction of the currents carried by the said terminal conductors, and an adjustable dial for the said instrument and arms depending from the magnet of the instrument for securing the dial; substantially as described.

3. In an electrical measuring instrument, a magnetic field composed of a sectional permanent magnet having a yoke and permanent magnets secured to the yoke, pole-pieces for the permanent magnet having opposing concave surfaces, and a spherical armature-core therefor, a circular armature adapted to rotate over the surface of said core between said pole-pieces and said armature-core, terminal conductors for the said armature being differentially coiled about the shaft of said armature so as to neutralize the effects of the mutual and self induction of the currents carried by said terminal conductors, and an indicator for said instrument carried by the armature, said armature together with the said armature-core and the said indicator being carried by said pole-pieces and removably attached to the said permanent magnet; substantially as described.

Signed at the city of New York, in the county of New York and State of New York, this 17th day of August, A. D. 1900.

FREDRICK A. LA ROCHE.

Witnesses:
LEWIS L. PIERCE,
JOHN I. ROONEY.